US008934583B1

United States Patent
Qi et al.

(10) Patent No.: US 8,934,583 B1
(45) Date of Patent: Jan. 13, 2015

(54) COUNTER-BASED DETECTOR

(75) Inventors: Yihong Qi, Santa Clara, CA (US); Hongyuan Zhang, Fremont, CA (US)

(73) Assignee: Marvell International Ltd. (BM)

( * ) Notice: Subject to any disclaimer, the term of this patent is extended or adjusted under 35 U.S.C. 154(b) by 155 days.

(21) Appl. No.: 13/432,132

(22) Filed: Mar. 28, 2012

Related U.S. Application Data

(60) Provisional application No. 61/469,051, filed on Mar. 29, 2011, provisional application No. 61/532,477, filed on Sep. 8, 2011, provisional application No. 61/594,546, filed on Feb. 3, 2012.

(51) Int. Cl.
 *H04L 27/06* (2006.01)
(52) U.S. Cl.
 USPC ............ 375/343; 370/509; 370/510; 375/260
(58) Field of Classification Search
 USPC .......................................... 370/241
 See application file for complete search history.

(56) References Cited

U.S. PATENT DOCUMENTS

| | | | | |
|---|---|---|---|---|
| 7,035,285 | B2 * | 4/2006 | Holloway et al. | 370/474 |
| 7,388,853 | B2 * | 6/2008 | Ptasinski et al. | 370/338 |
| 7,965,798 | B2 * | 6/2011 | Roh et al. | 375/343 |
| 8,009,724 | B2 * | 8/2011 | Razzell et al. | 375/150 |
| 8,031,587 | B1 * | 10/2011 | Kang | 370/210 |
| 8,149,863 | B1 * | 4/2012 | Sahotra et al. | 370/445 |
| 2006/0140293 | A1 * | 6/2006 | Lai et al. | 375/260 |
| 2009/0028220 | A1 | 1/2009 | Roh et al. | |
| 2009/0304128 | A1 * | 12/2009 | Izumi et al. | 375/343 |
| 2013/0155957 | A1 * | 6/2013 | Shin et al. | 370/328 |

* cited by examiner

*Primary Examiner* — Ian N Moore
*Assistant Examiner* — Lakeram Jangbahadur

(57) ABSTRACT

Systems, methods, and other embodiments associated with detecting an event are described. According to one embodiment, a device includes a detect logic that is configured to, during a sample window, monitor a communication channel for an event in a signal, wherein monitoring the communication channel for the event includes incrementing a counter in response to a magnitude of the communication channel being greater than a first predetermined threshold, and provide a detection signal in response to the counter reaching a second predetermined threshold, wherein the detection signal indicates detection of the event in the signal.

15 Claims, 5 Drawing Sheets

COUNTER-BASED DETECTOR

CROSS REFERENCE TO RELATED APPLICATIONS

This disclosure claims the benefit of U.S. Provisional Application No. 61/469,051 filed on Mar. 29, 2011, U.S. Provisional Application No. 61/532,477 filed on Sep. 8, 2011, and U.S. Provisional Application No. 61/594,546 filed on Feb. 3, 2012, which are hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Computer systems often use wireless communications to transfer information between two or more devices that are not physically connected. While wireless communications improve the convenience of connecting a device to a network, wireless communications also introduce many difficulties. Among these difficulties is interference from a wireless channel on which wireless communications are transferred.

Interference can arise from many different sources. These sources may be as simple as a circuit in an electronic device that emits an interfering signal or as complex as interference from multipath propagation delay. Interference can impair the ability of a receiver to differentiate wireless communication packets from noise. Thus, communicating in a wireless network, for example, can become impaired by an increase in false detections of packets and an increase in packet misses. Additionally, in multiple access networks where devices share a common channel, collisions between simultaneously transmitting devices may result when techniques for determining when a channel is busy are compromised from interference. These difficulties may result in degraded performance of the network.

SUMMARY

In one embodiment a device includes a detect logic that is configured to, during a sample window, monitor a communication channel for an event in a signal, wherein monitoring the communication channel for the event includes incrementing a counter in response to a magnitude of the communication channel being greater than a first predetermined threshold, and provide a detection signal in response to the counter reaching a second predetermined threshold, wherein the detection signal indicates detection of the event in the signal.

In another embodiment a method includes monitoring, in a receiver during a sample window, a communication channel for an event in a signal wherein monitoring the communication for the event includes incrementing a counter in response to a magnitude of the communication channel being greater than a first predetermined threshold, and generating a detection signal in response to the counter reaching a second predetermined threshold, wherein the detection signal indicates detection of the event in the signal.

In another embodiment, an integrated circuit includes a detect logic. The detect logic is configured to, during a sample window, monitor a communication channel for an event in a signal, wherein monitoring the communication for the event includes incrementing a counter in response to a magnitude of the communication channel being greater than a first predetermined threshold, and provide a detection signal in response to the counter reaching a second predetermined threshold, wherein the detection signal indicates detection of the event in the signal.

In another embodiment, a method for detecting whether an event has occurred within a predetermined time period includes using a peak detection algorithm to determine a first number of peaks that occur during the predetermined time period, wherein each peak of the first number of peaks is greater than a first predetermined threshold. The first number of peaks are compared to a second predetermined threshold. In response to the first number of peaks not exceeding the second predetermined threshold, having the peak detection algorithm indicate that the event has not occurred within the predetermined time period; and in response to the first number of peaks exceeding the second predetermined threshold, having the peak detection algorithm indicate that the event has occurred within the predetermined time period.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Figure 1:
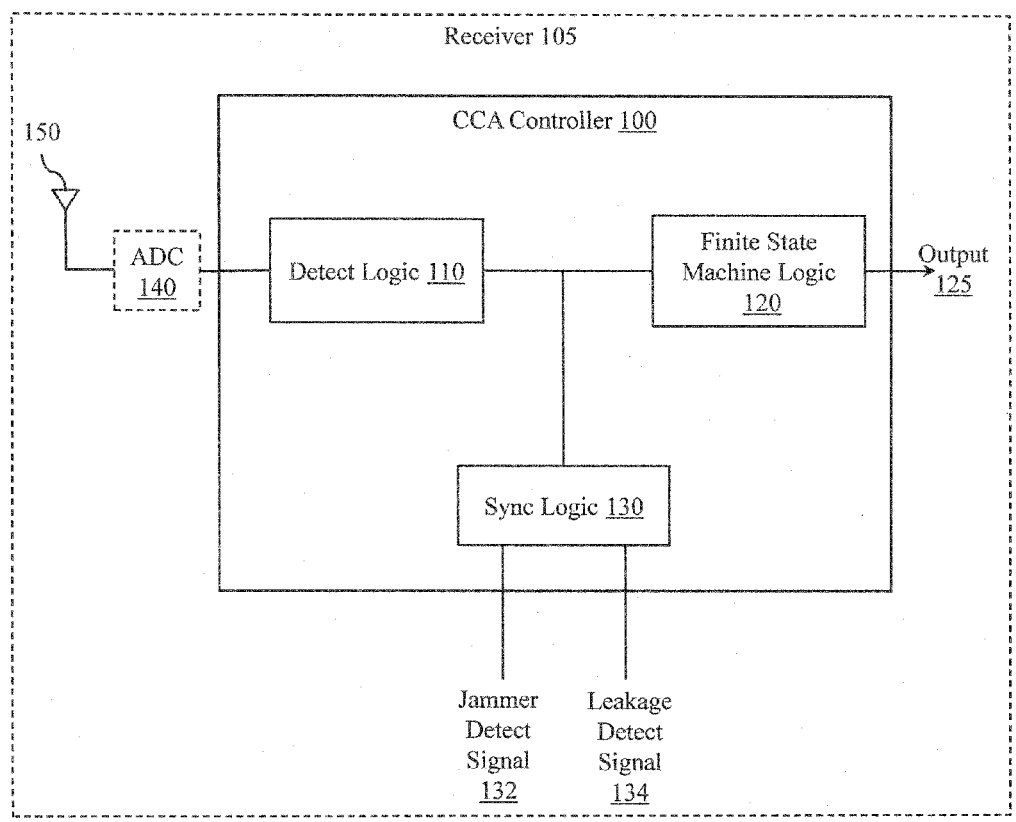
FIG. 1 illustrates one embodiment of a clear channel assessment (CCA) controller associated with detecting a guard interval on a communication channel.

Described herein are examples of systems, methods, and other embodiments associated with an improved detector that reduces the occurrence of false alarms and packet misses in a receiver. In one embodiment, a clear channel assessment (CCA) controller in a receiver is configured to detect a guard interval in a signal on a communication channel to determine when the communication channel is busy. In general, the present systems and methods may be implemented in a device that is configured to detect the occurrence of an event or condition using a counter and two thresholds. For example, the first threshold for magnitude or a sensor value of an event and the second threshold for a counter that records the number of times the event achieves the first threshold during an observation window.

Wireless communication devices, for example, those modulated by orthogonal frequency division multiplexing (OFDM), time division multiple access (TDMA), and so on, use guard intervals when transmitting a communication to mitigate the effects of intersymbol interference. Guard intervals occur prior to data symbols in the communication to provide time for interference (e.g., multipath interference) from a previous symbol to dissipate before transmitting a subsequent symbol. In this way, a transmitting device can avoid creating interference in the subsequent data symbol by using the guard interval. Accordingly, with this structure in mind, a receiver can monitor a communication channel for a guard interval to determine when the communication channel is busy, that is, when a communication is occurring on the channel.

For example, consider a CCA controller in a wireless receiver that is configured to determine when a communication channel is busy. The CCA controller uses, for example, a carrier sense detector and an energy detector to monitor for and determine the presence of a signal on the communication channel. Carrier sense refers to the ability of the receiver to detect and decode an incoming signal preamble which also denotes a length of time the channel will be busy for the incoming signal. Thus, for carrier sense to provide a positive indication of a signal on the channel the receiver must first decode the preamble and then provide the carrier sense indication to the receiver. However, carrier sense can fail when the preamble is not properly decoded or missed entirely and thus the idle/busy indication for the channel will be incorrect for the entirety of the communication.

Energy detection (ED) refers to the ability of the receiver to detect the non-Wi-Fi energy level present on the current channel based on, for example, the noise floor, ambient energy, interference sources, and unidentifiable Wi-Fi transmissions that may have been corrupted but can no longer be decoded. Unlike carrier sense, which can determine the exact length of time the medium will be busy with the current communication, energy detection samples the medium periodically to determine if the energy still exists. In addition, energy detection requires a pre-defined threshold which determines if the reported energy level is adequate to report the medium as busy or idle. Thus, operating at a lower sensitivity level (i.e., low signal strength) can render energy detect poorly suited for determining when the channel is busy due to the higher threshold values used with effective energy detect solutions.

A CCA controller configured with a carrier sense detector and an energy detector has a probability of false detection of a communication (i.e., probability of false alarm (Pfa)) and probability of missing an actual communication (i.e., probability of miss (Pmiss)) that are insufficient for more sensitive applications. That is, the CCA controller is likely to miss too many packets and falsely alert to the presence of packets that are not actually present. With higher Pfa and Pmiss values the receiver may not provide adequate quality of service in a network where, for example, a minimum transmission power is lower than a typical situation. Additionally, in a standard network, improving Pfa and Pmiss is also desirable.

Accordingly, in one embodiment, the CCA controller is configured with the ability to detect guard intervals within a communication in addition to using the carrier sense detector and energy detector to determine when a signal is present. In this way, detection of a communication does not rely solely on detecting the preamble or an energy level of the channel. Instead, the CCA controller may detect guard intervals throughout a communication. Thus, if the carrier sense detector or the energy detector fails, then a guard interval detector can provide an indication of a signal either at the beginning or throughout a communication, thereby improving the probability of properly detecting a communication.

With reference to FIG. 1, one embodiment of a device 100 configured to detect an event. In one embodiment, the device is a clear channel assessment (CCA) controller 100 that is associated with detecting a guard interval to determine when a wireless communication channel is busy. The CCA controller 100 is implemented in a network communication device that includes a transmitter (not shown) and a receiver 105 that are configured for communicating on a wireless communication channel. The receiver 105 may be a receiver in a network interface card (NIC) or similar device. The receiver 105 is configured to be compatible with, for example, the IEEE 802.11ac standard, 802.11n standard, and so on. In another embodiment, the receiver 105 may include one or more ports for physical connections and receive the signal from a connected cable or connected electric circuit.

In one embodiment, the CCA controller 100 includes detect logic 110, finite state machine (FSM) logic 120, and sync logic 130. Antenna 150 receives analog signals from the communication channel and an analog-to-digital converter (ADC) 140 converts the analog signals into digital signals, which are then provided to the detect logic 110 in the CCA controller 100. The detect logic 110 processes the signals and provides a raw output that indicates whether a guard interval is present on the communication channel. In one embodiment, the raw output may be combined with an output from the sync logic 130 prior to being provided to the FSM logic 120. Using the raw output from the detect logic 110, the FSM logic 120 generates and provides output 125 which is a refined form of the raw output that has been verified for accuracy. The refined output 125 is provided to a media access control (MAC) layer in the receiver 105 as the indication of whether a guard interval is present and thus whether the communication channel is busy or idle.

The detect logic 110 is configured to determine when the communication channel is busy by monitoring the communication channel for a guard interval that is part of a received signal (e.g., an OFDM signal, TDMA signal, or other type of wireless signal, signal from a cable or circuit, and so on). In one embodiment, the determination by the detect logic 110 is provided directly to the receiver 105. However, as discussed with reference to the FSM logic 120, the output of the detect logic may be verified prior to being used by the receiver 105. The receiver 105 uses the determination of whether the channel is busy to determine, for example, when to start processing an incoming signal from the ADC 140. Additionally, when the CCA controller 100 indicates that the communication channel is busy, the transmitter associated with the receiver 105 is configured to not transmit. Transmitting while the channel is busy causes interference with a signal on the communication channel and also interferes with the signal being transmitted.

Accordingly, in one embodiment, the detect logic 110 is configured to monitor the communication channel by calculating a moving average for the magnitude of the communication channel. The detect logic 110 calculates the moving average for the magnitude from, for example, an amplitude provided to the detect logic 110 from the ADC 140. The moving average is an average of values received for the amplitude over a previous period of time T. The amplitude is a current value of the communication channel as provided by the ADC 140. The amplitude includes, for example, signal strength of a signal being received on the communication channel, signal strength of interference from the communication channel, or other signal characteristic. Thus, the amplitude reflects any value presently on the communication channel.

In one embodiment, the detect logic 110 includes two separate calculation paths for calculating the moving average for the communication channel. The two separate calculation paths are associated with different types of guard intervals and determine moving averages based on differing transmission times for the different types of guard intervals, e.g., a short guard interval and a long guard interval. Thus, a first path calculates a moving average over a first period of time $T_1$ (e.g., 0.8 µs), which correlates with a length of time consumed by a long guard interval during a transmission. The second path calculates a moving average over a second period of time $T_2$ (e.g., 0.4 µs), which correlates with a length of time consumed by a short guard interval during a transmission.

The detect logic 110 is configured to compare the moving average to a first threshold value. In this way, the detect logic 110 can determine when the signal strength of the communication channel triggers a threshold (e.g., meets/reaches or exceeds the threshold value) and, thus, whether a received signal corresponds to a guard interval. For example, the detect logic 110 periodically (e.g., every 4 µs) compares a current value of the moving average to the first threshold value. If the moving average is greater than the first threshold value, then the detect logic 110 increments a counter denoting that the value of the moving average is greater than the predefined first threshold value for the present comparison. However, a single indication that the moving average triggers the threshold can be caused by interference and other abnormalities on the channel.

Thus, in addition to periodically comparing the moving average to the first threshold, the detect logic 110 is configured to compare a value of the counter to a second threshold. If the value of the counter is greater than the second threshold then the detect logic 110 generates and provides a detection signal that indicates a positive detection of a guard interval. If the counter does not trigger the second threshold, then the detect logic 110 provides a detection signal that indicates a negative detection of a guard interval. The counter accrues a total value during a window of time and whenever the total value is incremented a comparison occurs with the threshold. The total value of the counter is reset if counter triggers the threshold value. The total value may also be reset after expiration of the window of time.

Additionally, when the detect logic 110 is configured to include two separate calculation paths, the detect logic 110 includes a counter for each path. Thus, each path includes separate components for determining whether the specific type of guard interval is present (e.g., long or short). In this way, the detect logic 110 can detect guard intervals in differently configured signals. Thus, the detection signal generated and provided by the detect logic 110 reflects the detection of either type of guard interval. False detections (Pfa) and packet misses (Pmiss) associated with carrier sense detection and energy detection are improved by using the counter and second threshold comparison with the detect logic 110 to detect guard intervals on the channel.

To further verify whether the detection signal accurately identifies the presence of a guard interval, the FSM logic 120 provides a verification function for the determination results from the detect logic 110. The detection signal from the detect logic 110 is a raw determination of whether a guard interval is present. The FSM logic 120 refines the detection signal by checking the signal value with a history of values for detection signals. This will be described in more detail below with reference to FIG. 4. In general, the FSM logic 120 looks at the sequence of values formed by the current detection signal value and one or more past signal values to determine if the current detection value is correct. The FSM logic 120 then generates a result and provides the result as the output 125 as a final determination of the presence of a guard interval. Accordingly, the FSM logic 120 provides the output 125 as a refined determination that is a function of a history of previous detection signal values. In this way, the FSM logic 120 can provide a more reliable determination that further prevents isolated errors and anomalies from incorrectly causing a positive or negative detection of a guard interval.

In one embodiment, the FSM logic 120 is configured to select between three separate modes of operation based on a control signal. The three modes include a symmetric mode, an asymmetric mode, and a conventional mode. The control signal indicates to the FSM logic 120 to provide the output 125 according to an indicated mode. For example, depending on operating parameters including allowable processing delay for the output 125 and factors including acceptable false alarm rates and so on, the FSM logic 120 can be controlled to provide the output 125 in accordance with a mode that best suites the operating parameters.

In the conventional mode, the FSM logic 120 does not alter the detection signal and simply passes the detection signal along as the output 125. Accordingly, the conventional mode provides a low latency for the output 125 since no additional processing occurs. In the symmetric mode and the asymmetric mode, the FSM logic 120 provides the output 125 according to a history of values for the detection signal as stated previously. In one embodiment, the FSM logic 120 is configured to use an immediately previous value of the detection signal and a current value of the detection signal when verifying the value of the output 125 for the symmetric and asymmetric modes. In other embodiments, the FSM logic 120 uses additional historic values of the detection signal beyond the immediately previous value. Operations of the FSM logic 120 will be discussed in greater detail with reference to the example of FIG. 4 below where the output 125 is based on the current value and an immediately previous value of the detection signal.

In one embodiment, the detection signal from the detect logic 110 is modified based on one or more interference detection signals from the sync logic 130 prior to being provided to the FSM logic 120. The sync logic 130 is configured to provide a combined signal from two source signals. For example, the source signals include a jammer detect signal 132 and a leakage detect signal 134, which come from a jammer detection circuit and a leakage detection circuit, respectively. The sync logic 130 is configured to provide the combined signals to the FSM logic 120. In one embodiment, the sync logic 130 also combines the detection signal from the detect logic 110 with the leakage detect signal 134 and the jammer detect signal 132. The leakage detection circuit is a circuit that is configured to detect DC leakage on the communication channel. DC leakage from a circuit that is within a wireless range of the receiver 105 may produce a signal on the communication channel that interferes with other signals at the receiver 105. Thus, the leakage detect circuit is configured to determine when this condition exists and provide an indication to the CCA controller 100 so that the interference can be mitigated.

In a similar aspect, the jammer detection circuit determines whether interference from a radar signal or similar periodic signal exists on the communication channel and supplies an indication of this situation to the CCA controller 100. Interference from a radar signal affects the ability of the CCA controller 100 to detect a guard interval on the communication channel. The radar signal is periodic or repeating in a similar manner as a guard interval is throughout a wireless signal (e.g., an OFDM signal or TDMA signal). Thus, when a radar signal or similar signal is present the reliability of guard interval detection from the detect logic 110 and FSM logic 120 can become compromised. Therefore, the jammer detect circuit and the leakage detect circuit identify forms of interference that impede detecting a guard interval.

When providing the combined signal from the leakage detect circuit and the jammer detect circuit, the sync logic 130 is configured to first convert a frequency of the leakage detect signal and a frequency of the jammer detect signal. The sync logic 130 is configured to convert the jammer and leakage detect signals to match a frequency of the detection signal from the detect logic 110. The jammer and leakage detect signals initially have a frequency different from the detection signal. However, in order for the jammer and leakage detect signals to be combined with the detection signal they need to be synchronized. A positive indication by either the jammer detect signal or the leakage detect signal indicates that, for example, the detection signal is potentially invalid. Thus, the output of the sync logic 130 is combined with the detection signal from the detect logic 110. Combining the leakage detect signal 134 and the jammer detect signal 132 with the detection signal causes the detection signal to indicate no detection of a guard interval when either the jammer or the leakage detect signals are positive.

Figure 2:
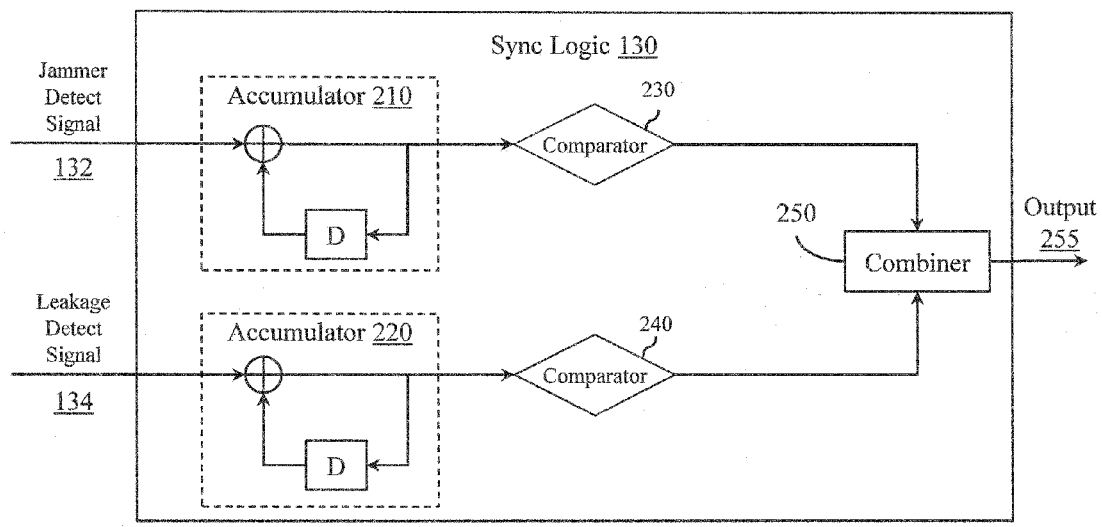
FIG. 2 illustrates one embodiment of sync logic in a CCA controller associated with detecting a guard interval on a communication channel.

In one embodiment, the sync logic 130 is configured to convert the frequency for the jammer detect signal 132 and leakage detect signal 134 to match the frequency of the detection signal without using interpolation. FIG. 2 illustrates one embodiment of the sync logic 130. In FIG. 2, the sync logic 130 receives the jammer detect signal 132 from a jammer detect circuit and the leakage detect signal 134 from a leakage detect circuit. The inputs 132 and 134 are provided to respective accumulators 210 and 220. The accumulators 210 and 220 are configured to accumulate the input signals 132 and 134 for a period of time (e.g., 4 µs). By accumulating the incoming signals 132 and 134 and periodically comparing the signals to a threshold in comparators 230 and 240, the signals 132 and 134 can be delayed. Delaying the signals 132 and 134 in this manner converts the frequency to match the frequency of the detection signal.

The accumulators 210 and 220 delay the signal by, for example, combining new signal values as they are received with a previous signal value. In one embodiment, consider an example for FIG. 2. The input frequency of jammer detect signal 132 and leakage detect signal 134 is 40 MHz, and the output frequency of output 255 is 0.25 MHz (¼ us). The delay line "D" is one sample delay of the input jammer (or leakage) signal, i.e., ¹⁄₄₀ MHz=0.025 us. The output frequency of the accumulators 210 and 220 is the same as its input, i.e., 40 MHz. The value of the accumulator output is the input jammer detect signal 132 plus summation of all previous jammer detect signals starting from reset, i.e., $$d(n) + \sum_{m=0}^{n-1} d(m).$$

If all jammer detect signals during a 4 us window is (detect=1), the accumulator output 255 is 4 us*40 MHz=160 at the end of the 4 us window. The accumulated signals are periodically compared to threshold values in comparators 230 and 240 at a rate that matches a frequency of the detection signal. After the comparison the accumulators 210 and 220 are reset to allow new values to accumulate for the next comparison. The combiner 250 is configured to combine the output from comparators 230 and 240 into output 255 in order to provide a single output signal. The combiner 250 is, for example, an OR logic gate. In this way, the sync logic 130 is configured to provide the output 255 that can be used to enhance the reliability of the detection signal.

Further details of detecting a guard interval to determine when a communication channel is busy will be discussed in conjunction with FIGS. 3 and 4. However, in other embodiments, the system is not limited to detecting a guard interval or to a CCA controller but can be implemented in other devices that are configured to detect an event or condition. For example, the device may include a temperature control device including a temperature sensor/detector configured with the techniques described herein. The detected event or condition may be defined as the presence of a guard interval in a signal (in one embodiment) but can be other events or conditions that are detected using the counter and two threshold technique described herein (e.g., detect temperature, other portions of signals, and so on).

Figure 3:
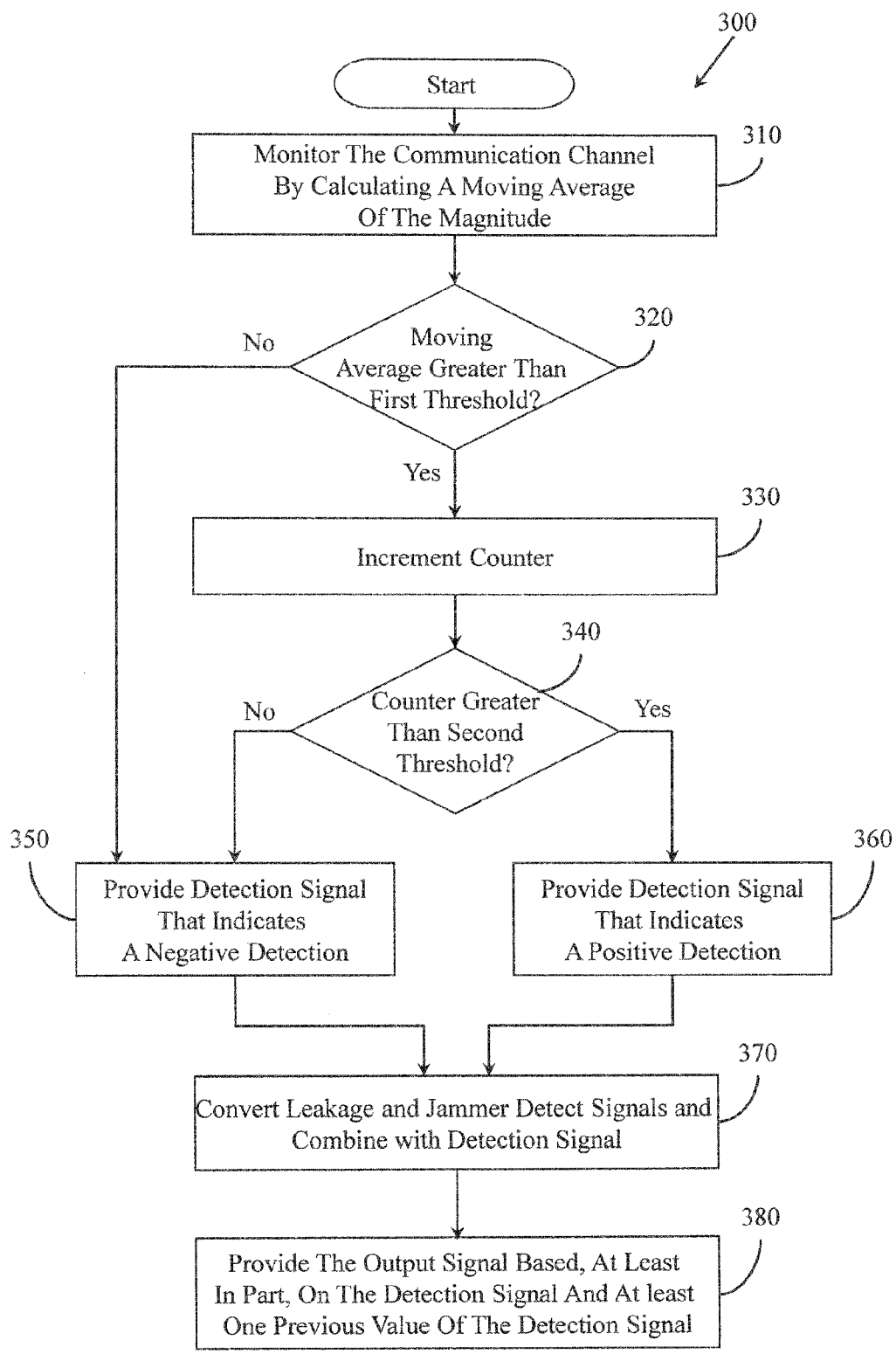
FIG. 3 illustrates one embodiment of a method associated with detecting a guard interval on a communication channel.

With reference to FIG. 3, FIG. 3 illustrates one embodiment of a method 300 associated with detecting a guard interval on a communication channel. FIG. 3 is discussed from the perspective that the method 300 is implemented and performed by, for example, the CCA controller 100 of FIG. 1.

At 310, method 300 begins by monitoring a communication channel to determine when the communication channel is busy. In one embodiment, a clear channel assessment (CCA) controller monitors the channel by calculating a moving average of the magnitude of any signal present on the communication channel. Monitoring of the communication channel occurs continuously to ensure that a signal is not missed. Thus, while the method 300 is continuously monitoring the communication channel, at 320, a comparison periodically occurs (e.g. every 4 µs) between a current value of the moving average and a first threshold value. The first threshold value is a minimum peak value for the moving average that indicates the presence of a guard interval on the communication channel. Accordingly, comparing a current value of the moving average for the communication channel to the threshold value will provide an indication of whether a guard interval is present and thus whether the channel is busy. The threshold value is a predetermined value based on the peak value of the moving average. However, in some embodiments, the first threshold value is programmable but still predetermined. In this way, the CCA controller can be dynamically modified with different threshold values for different operating circumstances.

At 320, if the current value of the moving average for the communication channel is not greater than the first threshold value, then method 300 proceeds to 350. At 350, method 300 provides a detection signal that indicates that a guard interval has not been detected on the communication channel. At 320, if the current value of the moving average is greater than the first threshold value then method 300 proceeds to 330.

At 330, method 300 increments a counter that tracks a number of occurrences during a period that the moving average triggers the first threshold value (e.g., meets or exceeds the threshold value). By using the counter instead of passing along a positive determination from 320 of method 300, method 300 avoids isolated detection errors that would otherwise be propagated throughout method 300 and possibly cause incorrect positive detections signal.

Accordingly, after incrementing the counter, method 300 proceeds to 340. At 340, method 300 determines whether a current value of the counter triggers a second threshold (e.g., meets or exceeds a second threshold value). The second threshold value is a predetermined value that is selected to prevent the propagation of errors from isolated events on the communication channel. The isolated events are, for example, ephemeral interfering signals that are not part of a communication, degraded communications that cannot be decoded, noise from ambient sources, and so on. The second threshold value is selected, for example, based on the operating conditions and characteristics of a receiver associated with method 300. For example, if the receiver is configured to operate at a close range to another device and to receive a signal that has a low signal strength (e.g., −72 dbm compared with 20 dbm), then the second threshold value may be increased to avoid a greater possibility of interference and/or errors that are encountered when operating under the specific conditions. Additionally, in some embodiments, the second threshold value is programmable. That is, the second threshold value can be dynamically modified based on, for example, a change in operating conditions.

Continuing with 340 of method 300, if the value of the counter is not greater than the second threshold value, then method 300 proceeds to 350 where the detection signal is provided with a negative value since no guard interval has been detected. By providing the detection signal with a negative indication and not providing the detection signal only when a guard interval has been detected, method 300 can track a history of the detection signal to provide a refined output at 380. At 340, if the value of the counter is greater than the second threshold value, then method 300 proceeds to 360 where the detection signal is provided with a positive indication that a guard interval has been detected.

Upon providing the detection signal at either 350 or 360, method 300 continues to 370. At 370, method 300 converts leakage and jammer detect signals to match a frequency of the detection signal. Once the leakage and jammer detect signals are converted and combined, the combined output is combined with the detection signal. In this way, method 300 can account for the specific types of interference indicated by the jammer and leakage detect signals. In one embodiment, when either of the jammer or leakage detect signals are positive, method 300 ensures the detection signal indicates that no guard interval has been detected. Method 300 can modify the detection signal under these circumstances since a positive indication by the detection signal when the leakage or jammer detect signals are positive is not reliable. This is because the forms of interference indicated by the leakage and jammer detect signals are similar in form to a guard interval and thus can incorrectly cause a positive detection. In some embodiments, block 370 is optional and thus may not be included.

After 370, method 300 proceeds to 380 where an output signal is provided based on the detection signal and at least one previous value of the detection signal. The output signal produced at 380 is provided to a media access control (MAC) layer in, for example, a network interface card (NIC). As previously explained, the output signal provides an indication of whether the communication channel is presently busy. The output signal also indicates when a communication is being received and, therefore, provides an alert or indication to components associated with a receiver to prepare to begin processing. While method 300 is discussed as a generally linear sequence, two or more of the actions 310 through 380 may occur substantially in parallel. For example, while the output is being determined at 380, the method 300 may be monitoring the communication channel (at 310) and periodically comparing the value of the moving average (at 320).

Figure 4:
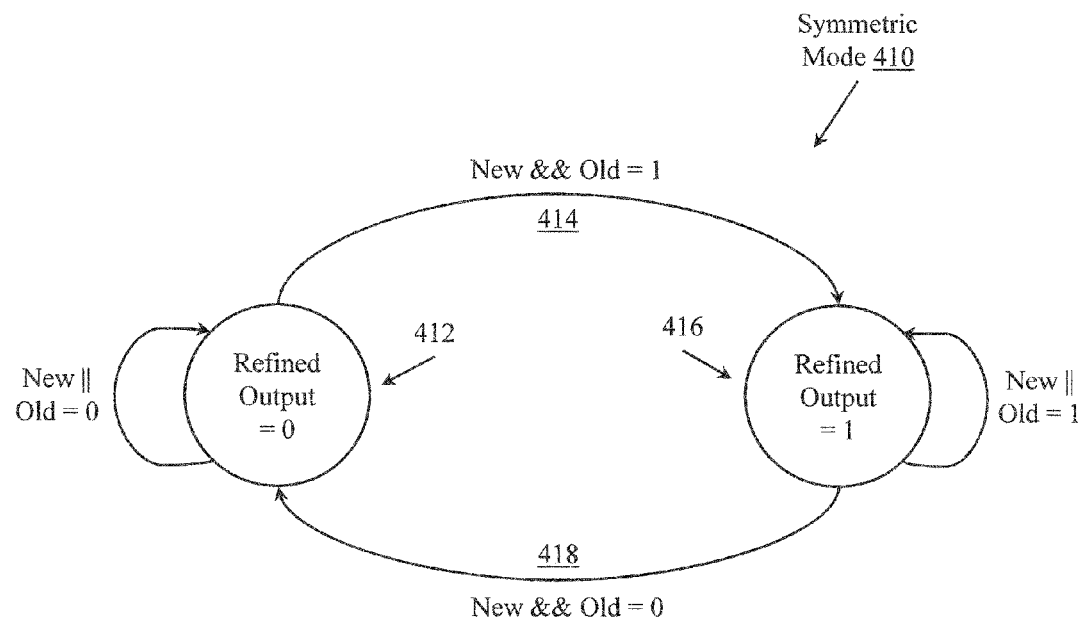
FIG. 4 illustrates exemplary finite state diagrams for providing a refined output in a receiver associated with detecting a guard interval on a communication channel.
Figure 4:
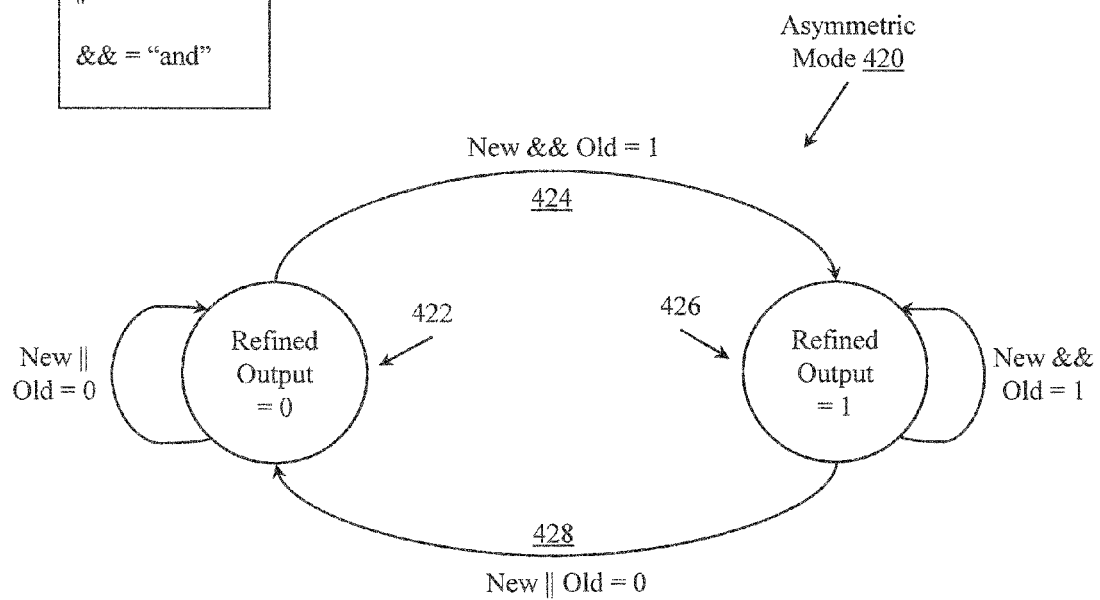

FIG. 4 illustrates two separate modes of operation for providing the output signal at 380 of method 300. In FIG. 4, the label "New" refers to a current value of the detection signal as provided at 350 and 360 of method 300. The label "Old" refers to an immediately previous value of the detection signal prior to the current value. The symmetric mode 410 defines a function for changing the output signal from one state to another when old and new values of the detection signal are the same (e.g., both "1"). The asymmetric mode 420 defines a function for changing the output signal to a positive indication when both new and old values are positive but changing to a negative indication when either the new or old value is negative.

For the symmetric mode 410, when the refined output is negative (e.g., 0) shown at state 412, to change the refined output to positive (e.g., 1) shown at state 416, both the current value (e.g., "New") of the detection signal must be positive as well as the previous value (e.g., "Old") to transition along 414. When the refined output is positive at state 416, to change the refined output to negative at state 412, both the current value of the detection signal and the previous value of the detection signal must be negative to transition along 418.

For the asymmetric mode 420, when the refined output is negative at state 422, transitioning along 424 will occur only if both the current value of the detection signal and the previous value of the detection are positive. However, for the asymmetric mode 420, to transition along 428 to the negative refined output at state 422, only a single value needs to be negative. That is, either the current value of the detection signal or the previous value of the detection signal may be negative to provide a refined output that is also negative for the asymmetric mode 420. This is shown as the operation "New∥Old" meaning New OR Old as represented in the legend of FIG. 4.

The asymmetric mode 420 and the symmetric mode 410 provide different benefits under different operating conditions. For example, the symmetric mode 410 decreases the probability (Pmiss) of missing a communication signal and also decreases the probability (Pfa) of generating a false alarm. The asymmetric mode 420 provides enhanced detection of false alarms.

The example method of operation for block 380 of method 300 as illustrated in FIG. 3 includes using only a single previous value of the detection signal. However, in other embodiments, additional previous values can be used in addition to the current value of the detection signal when determining a value of the refined output. In this way, a system implementing method 300 and the asymmetric mode 420 and/or symmetric mode 410 in block 380 can be adapted to different functional requirements for detecting guard intervals while mitigating errors.

Figure 5:
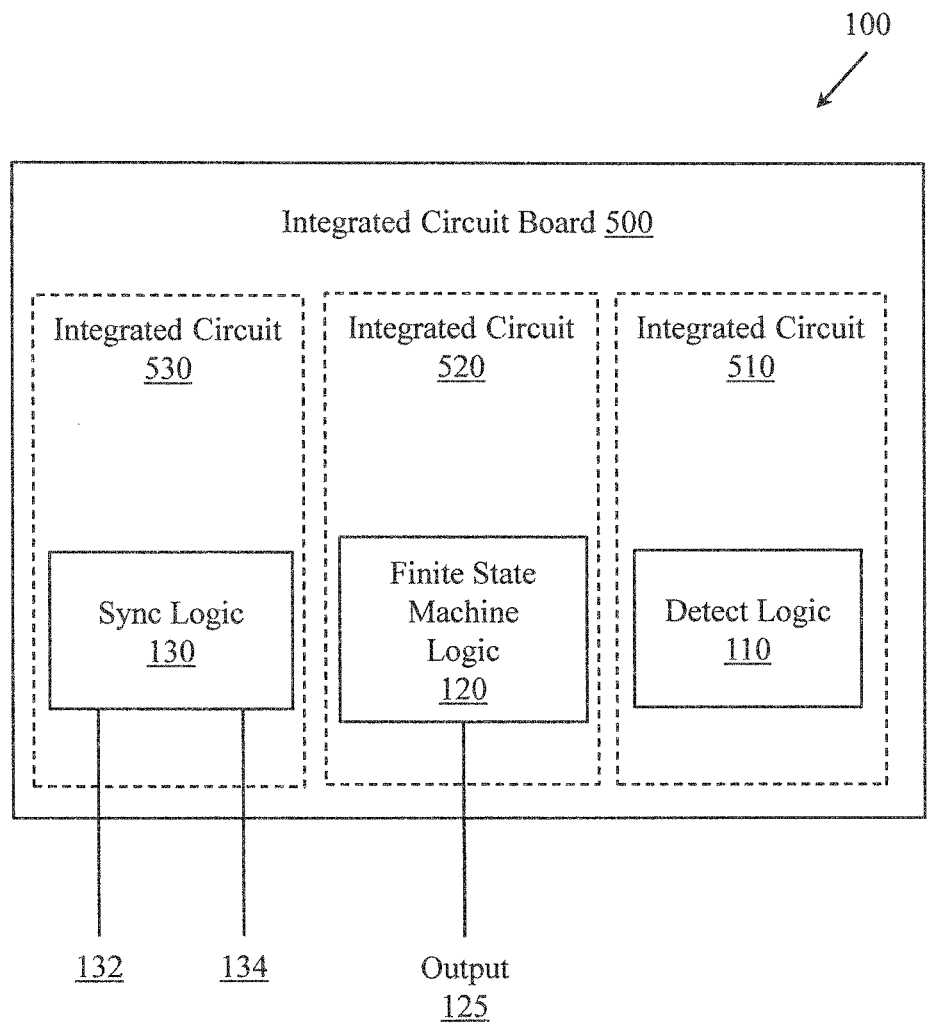
FIG. 5 illustrates one embodiment of an integrated circuit associated with detecting a guard interval on a communication channel.

FIG. 5 illustrates another embodiment of the CCA controller 100 from FIG. 1 that is configured with separate integrated circuits and/or chips. In this embodiment, the detect logic 110 from FIG. 1 is embodied as a separate integrated circuit 510. Additionally, the FSM logic 120 is embodied on an individual integrated circuit 520. The sync logic 130 is embodied on an individual integrated circuit 530. The circuits are connected via connection paths to communicate signals. While integrated circuits 510, 520, and 530 are illustrated as separate integrated circuits, they may be integrated into a common integrated circuit board 500. Additionally, integrated circuits 510, 520, and 530 may be combined into fewer integrated circuits or divided into more integrated circuits than illustrated.

In another embodiment, the detect logic 110 and the FSM logic 120 illustrated in integrated circuits 510 and 520 may be combined into a separate application specific integrated circuit. In other embodiments, the functionality associated with the logics 110, 120, and 130 may be embodied as firmware executable by a processor.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a microprocessor programmed with instructions to perform an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components, methods, and/or functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A device, comprising:
   a detect logic implemented in an integrated circuit configured to
      during a sample window, monitor a communication channel for an event in a signal, wherein monitoring the communication channel for the event includes incrementing a counter in response to a magnitude of the communication channel being, greater than a first predetermined threshold, and provide a detection signal in response to the counter reaching a second predetermined threshold, wherein the detect logic is configured to monitor the communication channel for the event that is a, guard interval in the signal,
   wherein the detection signal indicates the detection of the, guard interval in the signal, wherein the detect logic is configured to increment the counter when a moving average of the magnitude of the communication channel exceeds the first predetermined threshold, and wherein the moving average is calculated over the sample window, and wherein providing the detection signal includes providing the detection signal to indicate that no guard interval has been detected when the counter does not reach the second predetermined threshold within a predetermined time period.

2. The device of claim 1, further comprising:
   a finite state machine (FSM) logic configured to provide an output signal based, at least in part, on the detection signal and a history of previous values of the detection signal, wherein the output signal indicates whether the communication channel is presently busy.

3. The device of claim 2, wherein the FSM logic is configured to select between operating in an asymmetric mode, a symmetric mode, or a conventional mode based, at least in part, on a control signal, and wherein the FSM logic is configured to transition the output signal to indicate detection of a guard interval from an wireless signal on the communication channel when the detection signal and a previous detection signal are both positive.

4. The device of claim 2, wherein the FSM logic is configured to provide the output signal according to an asymmetric mode that includes transitioning the output signal to indicate no detection of a guard interval when either the detection signal or a previous detection signal are negative, and
   wherein the FSM logic is configured to provide the output signal according to a symmetric mode that includes transitioning the output signal to indicate no detection of the guard interval when both the detection signal and a previous detection signal are negative.

5. The device of claim 1, further comprising:
   a sync logic configured to
      convert a frequency of a leakage detect signal and of a jammer detect signal to match a frequency of the detection signal without using interpolation, wherein the leakage detect signal and the jammer detect signal are signals that indicate the presence of interference on the communication channel, and
      combine, prior to the detection signal being provided to a finite state machine, the leakage detect signal and the jammer detect signal with the detection signal by causing the detection signal to indicate no detection of the event when either the jammer detect signal or the leakage detect signals are positive.

6. A method, comprising:
   monitoring, in a receiver during a sample window, a communication channel for an event in a signal, wherein monitoring the communication for the event includes incrementing a counter in response to a magnitude of the communication channel being greater than a first predetermined threshold; and
   generating a detection signal in response to the counter reaching a second predetermined threshold, wherein monitoring the communication channel includes defining the event as a presence of a guard interval in the signal,
wherein the detection signal indicates the detection of the guard interval in the signal, wherein monitoring the communication channel includes incrementing the counter when a moving average of the magnitude of the communication channel exceeds the first predetermined threshold, and wherein the moving average is calculated over the sample window, and wherein generating the detection signal includes generating the detection signal to indicate that no guard interval has been detected when the counter does not reach the second predetermined threshold within a predetermined time period.

7. The method of claim 6, further comprising:
providing an output signal based, at least in part, on the detection signal and a history of previous values of the detection signal, wherein the output signal indicates whether the communication channel is presently busy.

8. The method of claim 7, wherein providing the output signal includes controlling the receiver to provide the output signal according to an asymmetric mode, a symmetric mode, or a conventional mode based, at least in part, on a control signal, and wherein providing the output signal includes transitioning the output signal to indicate detection of the guard interval from the signal on the communication channel when the detection signal and a previous detection signal are both positive.

9. The method of claim 7, wherein providing the output signal includes controlling the receiver to provide the output signal according to an asymmetric mode that includes transitioning the output signal to indicate no detection of a guard interval when either the detection signal or a previous detection signal are negative, and
wherein providing the output signal includes controlling the receiver to provide the output signal according to a symmetric mode that includes transitioning the output signal to indicate no detection of a guard interval when both the detection signal and a previous detection signal are negative.

10. The method of claim 7, further comprising:
converting a frequency of a leakage detect signal and of a jammer detect signal to match a frequency of the detection signal without using interpolation, wherein the leakage detect signal and the jammer detect signal are signals that indicate the presence of interference on the communication channel, and
combining, prior to providing the output signal, the leakage detect signal and the jammer detect signal with the detection signal by causing the detection signal to indicate no detection of the event when either the jammer detect signal or the leakage detect signals are positive.

11. An integrated circuit, comprising:
a detect logic implemented in the integrated circuit and configured to
during a sample window, monitor a communication channel for an event in a signal, wherein monitoring the communication for the event includes incrementing a counter in response to a magnitude of the communication channel being greater than a first predetermined threshold, and
provide a detection signal in response to the counter reaching a second predetermined threshold, wherein the detection signal indicates detection of the event in the signal, wherein the detect logic is configured to monitor the communication channel for the event that is a guard interval in the signal,
wherein the detection signal indicates the detection of the guard interval in the signal, wherein the detect logic is configured to increment the counter when a moving average of the magnitude of the communication channel exceeds the first predetermined threshold, wherein the moving average is calculated over the sample window, and
wherein providing the detection signal includes providing the detection signal to indicate that no guard interval has been detected when the counter does not reach the second predetermined threshold within a predetermined time period.

12. The integrated circuit of claim 11, further comprising:
a finite state machine (FSM) logic configured to provide an output signal based, at least in part, on the detection signal and a history of previous values of the detection signal, wherein the output signal indicates whether the communication channel is presently busy.

13. The integrated circuit of claim 12, wherein the FSM logic is configured to select between operating in an asymmetric mode, a symmetric mode, or a conventional mode based, at least in part, on a control signal, and wherein the FSM logic is configured to transition the output signal to indicate detection of the guard interval from the signal on the communication channel when the detection signal and a previous detection signal are both positive,
wherein the FSM logic is configured to provide the output signal according to an asymmetric mode that includes transitioning the output signal to indicate no detection of the guard interval when either the detection signal or a previous detection signal are negative, and
wherein the FSM logic is configured to provide the output signal according to a symmetric mode that includes transitioning the output signal to indicate no detection of the guard interval when both the detection signal and a previous detection signal are negative.

14. The integrated circuit of claim 11, further comprising:
a sync logic configured to
convert a frequency of a leakage detect signal and of a jammer detect signal to match a frequency of the detection signal without using interpolation, wherein the leakage detect signal and the jammer detect signal are signals that indicate the presence of interference on the communication channel, and
combine the leakage detect signal and the jammer detect signal with the detection signal by causing the detection signal to indicate no detection of the event when either the jammer detect signal or the leakage detect signals are positive.

15. A method for detecting whether an event has occurred within a predetermined time period, the method comprising:
using a peak detection algorithm by an integrated circuit to determine a first number of peaks that occur during the predetermined time period, wherein each peak of the first number of peaks is greater than a first predetermined threshold;
comparing the first number of peaks to a second predetermined threshold;
in response to the first number of peaks not exceeding the second predetermined threshold, having the peak detection algorithm indicate that the event has not occurred within the predetermined time period; and
in response to the first number of peaks exceeding the second predetermined threshold, having the peak detection algorithm indicate that the event has occurred within the predetermined time period wherein the event is an occurrence of a guard interval in a signal being analyzed, wherein determining the first number of peaks includes monitoring the signal by incrementing the first number of peaks using a counter when a moving average of a magnitude of the signal exceeds the first predetermined threshold, and wherein the moving average is calculated over a sample window associated with the predetermined time period.

* * * * *